Nov. 29, 1932.   G. W. PICKARD   1,889,568
UNIVERSALLY ADJUSTABLE RADIO APPARATUS FOR AIRCRAFT
Filed June 22, 1929
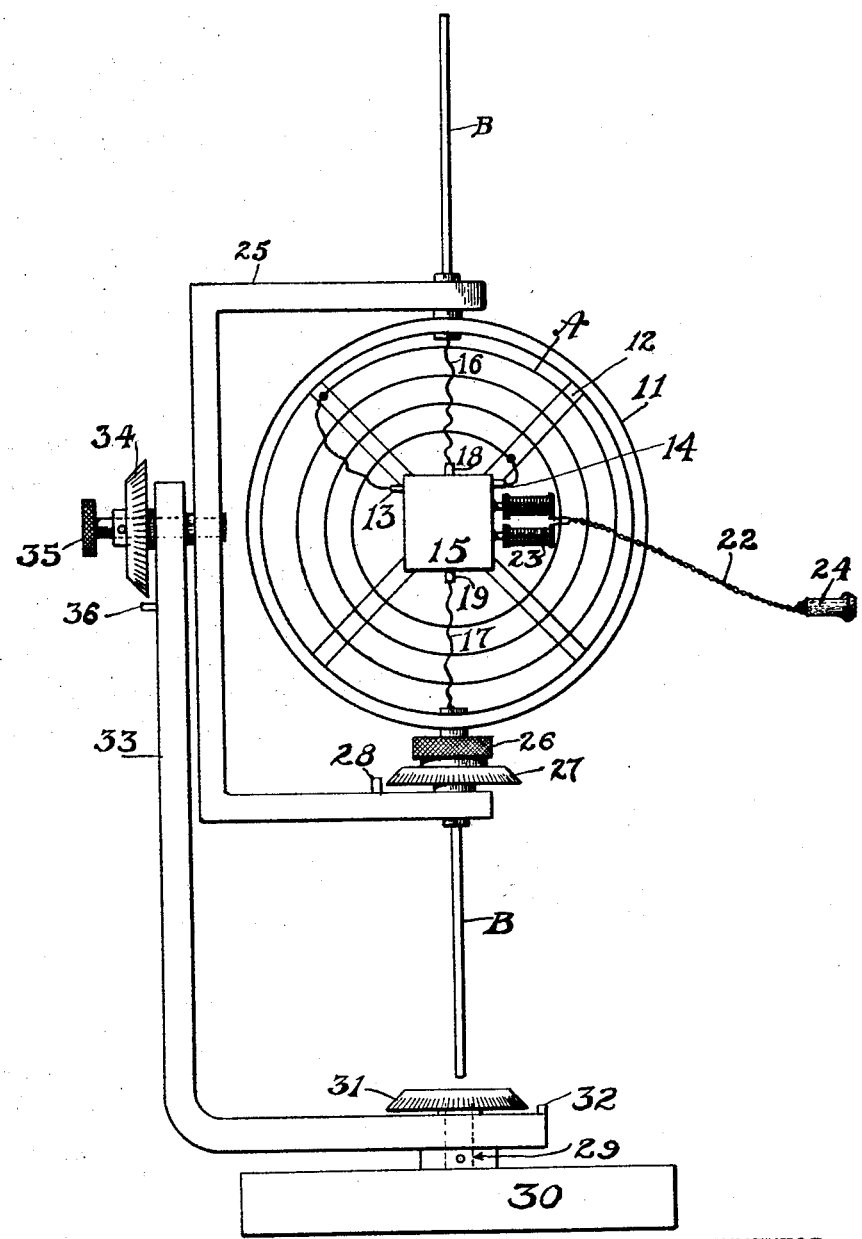
INVENTOR
GREENLEAF WHITTIER PICKARD
BY
      Philip Farnsworth
ATTORNEY Patented Nov. 29, 1932

1,889,568

UNITED STATES PATENT OFFICE

GREENLEAF WHITTIER PICKARD, OF NEWTON CENTRE, MASSACHUSETTS, ASSIGNOR, BY MESNE ASSIGNMENTS, TO GENERAL ELECTRIC COMPANY, A CORPORATION OF NEW YORK

UNIVERSALLY ADJUSTABLE RADIO APPARATUS FOR AIRCRAFT

Application filed June 22, 1929. Serial No. 372,971.

This invention relates to directive radio apparatus comprising two aerials and more particularly, to a three dimensional directive radio apparatus which is substantially universally adjustable in any plane. This case is a continuation in part of my application, S. N. 507,663, filed October 14, 1921 for radio apparatus, which has now eventuated into Patent 1,718,431, dated June 25, 1929.

Owing to the now well known fact that electrical waves of the frequencies now employed in radio communication are in general substantially reflected by the partially conducting surface of the ground and nearly completely reflected by the surface of the ocean, it is necessary in order to avoid errors in three dimensional bearings to so locate the apparatus that it is not subject to the resultant of the incident and reflected wave. A suitable location, in so far as this source of error is concerned, is that of a considerable height above the earth's surface, as on an aircraft.

Inasmuch as the amount of reflection of an electric wave by a partially conducting surface is proportioned directly to the conductivity (which cannot be easily controlled) and inversely to the wave length, it is possible to reduce the distorting effect of earth reflection by using a short wave length.

It is further necessary—as is recognized in the use of the ordinary two dimensional radio compass—to avoid the distorting effect of large metal or other conducting masses in the immediate vicinity of the directional aerials. In case this is impossible, any of the now well known methods of compensation may be used with this apparatus, such for example, as compensating conductor loops so disposed as to annul the distortion caused by the conductors of the ship or aircraft. Or as is the usual method used with two dimensional direction finding, the errors can be ascertained by a preliminary calibration from a known transmitter, and these errors corrected either by reference to a correction chart or by embodying these corrections in a mechanical compensator.

Heretofore apparatus has been designed for reception in a horizontal plane, and the reception characteristics of aerials have been studied principally, if not exclusively, in that plane.

In my application above designated, I have shown and disclosed an improved device comprising a plurality of aerials in a unitary construction, said combination having three dimensional characteristics designed to receive useful signals directionally in all planes, i. e., a three dimensional direction finder of radio compass, and to eliminate static coming from any point in altitude or azimuth, i. e., from any direction in space.

The present invention is directed to an improved means for realizing the advantages of my prior invention above identified.

The single figure of the drawing is an elevation of an improved form of apparatus as disclosed in my prior application, above referred to. The electrical characteristics of the present device are substantially completely disclosed in my prior application and will not be referred to herein, as the present invention is directed to the novel improvements in the apparatus therein discussed.

Referring now to the single figure of the drawing, there is illustrated a form of the invention which is primarily adapted for use as a radio compass or direction finder on aeroplanes, dirigibles, balloons, etc., or for the purpose of determining from any station the location of a distant aircraft when transmitting. In this figure there is illustrated a frame 11 of insulating material having cross pieces 12 of similar insulating material. On the cross pieces 12 is secured a loop A of wire, forming a multi-turn loop of any suitable or required dimension. As here illustrated, this loop A is so wound that the several turns thereof lie in substantially the same plane and spaced from each other, although they may be wound in any suitable manner as conditions may require. The ends of the loop A extend, at points 13 and 14, into a shielding box 15 secured to frame 11 and containing the adjustable elements of the apparatus, as disclosed more in detail and claimed in my application, above referred to.

While the member 15 has been shown as mounted in conjunction with the loop structure, it will, of course, be appreciated that it may be mounted separately therefrom and connected thereto by suitable leads.

Mounted at diametrically opposite points on the frame 11 are two aligned metal rods 13 constituting an open aerial, structurally distinct from closed loop A in the sense of being insulated from it. Conductors 16 and 17 are electrically connected to the rods B and extend into the box 15, as indicated at 18 and 19, within which cabinet they are suitably associated with the adjustable devices, described in my prior application, above identified.

Loop A has in series with it an adjustable tuning condenser and an inductance positioned within the member 15, while the open aerial B has a similar inductance centered around a variable condenser, the whole being suitably incorporated and positioned within the control box 15. Suitable leads 22 extend from the casing 15 and are provided with a filter diagrammatically illustrated as choke-coils 23, these being connected by leads 22 to a telephone receiver 24. This filter, which for some purposes, may consist of simply a pair of choke coils, acts to prevent any disturbing action either from the capacity of the telephone receiver 24 to the apparatus body, or from any energy which might be picked up by these leads or by means of any high frequency drainage from the system contained in the box 15.

Member 15, as may be well understood, is preferably made of metal and so constituted and arranged as to provide the maximum shielding to the devices positioned therein.

Frame 11—12 supporting the loop A and aerial B is mounted for rotation on an axis journaled in a yoke 25, the frame being adjustable on this axis by rotating the knob 26 which is journaled in yoke 25. A suitable dial 27 rotatable with the axis of frame 11—12 cooperates with a finger or indicator 28 fixed to yoke 25 for indicating the angular position, as in degrees, of the loop.

The yoke 25 is rotatable as a whole about the axis 29 and is rotatable in still another plane on frame 33, which is itself revolubly mounted on axis 29 which is associated with a suitable base 30. Base 30 is provided with an axis 29, on which is mounted the rotatable supporting member 33, dial 31 being fixedly supported on the axis 29. An indicator 32 is fixed on member 33, and so positioned and arranged with respect to indicator 31 as to indicate the angular position of the system about the axis 29. The yoke 25 is mounted in a like manner on the member 33, being provided with an axis having a control knob 35 and having an associated indicator dial mechanism 34. Indicator 36 is suitably secured to member 33 and positioned with respect to dial 34 so as to determine the angular rotation of the latter.

It will now be seen that the combined loop-aerial system is universally mounted and that the component parts thereof are revoluble on each axis 360° or less to position them in any angular position in space.

The movement on both axes may be accomplished by actuating knob 35, rotating it on its own axis, and also using it as a handle to rotate the system about the axis 29. Individual adjustment of the loop may be accomplished by the proper manipulation of member 26. It will thus be seen that by suitably determining the values of the several dials 27, 31 and 34, any angular position in space may be determined, and with such three coordinates, the solid angle of a received signal and consequently its true direction may be accurately determined.

This improved result is made possible by the universality of the adjustment of this improved device, and it will be apparent that while a particular receiving circuit has been referred to in connection with this device, any other suitable receiving circuit may be associated therewith in any location and the necessary circuit controls positioned within reach of the operator, while the improved antenna-loop device, as above intimated, may be suitably positioned in another part of the aircraft, or, at a ground station, it may be mounted on a tower distant from the operator and his controls in order to avoid interference, either mechanical or electrical.

It will now be apparent that there has been provided an improved three dimensional radio directive apparatus which is substantially universal in its application, being adapted to receive or transmit a signal from any position in space, and appropriately determine the direction of a received signal or a transmitted one.

It will be further appreciated that by virtue of the simplified construction herein shown, highly desirable economies in manufacture and efficiency in operation are secured by the improved construction of the present invention.

What is claimed is:

The improved directive radio apparatus of the general type including a frame, and an antenna and loop combination carried by the frame in a relation wherein the antenna extends in the plane of the loop, the improved apparatus including a primary frame-support in which said frame is mounted for rotation about the antenna as an axis, and means indicating angular positions of the frame resulting from such rotation; a second support in which said primary frame-support is mounted for rotation of the frame in a plane of revolution of the antenna about the center of the loop as an axis, and means indicating angular positions of the frame resulting from such rotation; and a third support in which said second support is mounted for rotation of the frame about the antenna as an axis while the frame is in any position resulting from the above rotations, and means indicating angular positions of the frame resulting from such third rotation; said three indicating means providing three coordinates as a basis for accurate determination of the desired information.

In testimony whereof I hereunto affix my signature.

GREENLEAF WHITTIER PICKARD.